United States Patent [19]

Sommani et al.

[11] Patent Number: 4,910,733

[45] Date of Patent: Mar. 20, 1990

[54] RENDEZVOUS NETWORK PROTOCOL WITH REDUCED BANDWIDTH AND PROCESSOR TIME

[76] Inventors: Arun Sommani, 16609 126th Ave. NE., Woodeinville, Wash. 98072; Amitabha Gupta, 1243 Picasso Dr., Sunnyvale, Calif. 94087

[21] Appl. No.: 168,169

[22] Filed: Mar. 15, 1988

[51] Int. Cl.⁴ .............................................. H04J 3/26
[52] U.S. Cl. ..................................... 370/85.1; 370/13; 370/94.1
[58] Field of Search ............................. 370/85, 94, 13; 340/825.5; 371/15, 16

[56] References Cited

U.S. PATENT DOCUMENTS 4,276,593  6/1981  Hansen ................................. 364/187

Primary Examiner—Douglas W. Olms
Assistant Examiner—Min Jung
Attorney, Agent, or Firm—Thomas R. Morrison

[57] ABSTRACT

A network protocol elminates all acknowledge data packets. A health check data packet is broadcast periodically by each node in the network. Each node uses the health check data packets to maintain a library of node health conditions, thereby permitting avoidance of transactions with a node that is not working. If a node detects bad data directed to it, it transmits a negative acknowledge data packet, thus permitting the originating node to correct and/or retransmit the data packet found to be bad. A node in danger of becoming overloaded broadcasts a distress messege, whereby other nodes reduce data packets sent to it.

4 Claims, 4 Drawing Sheets

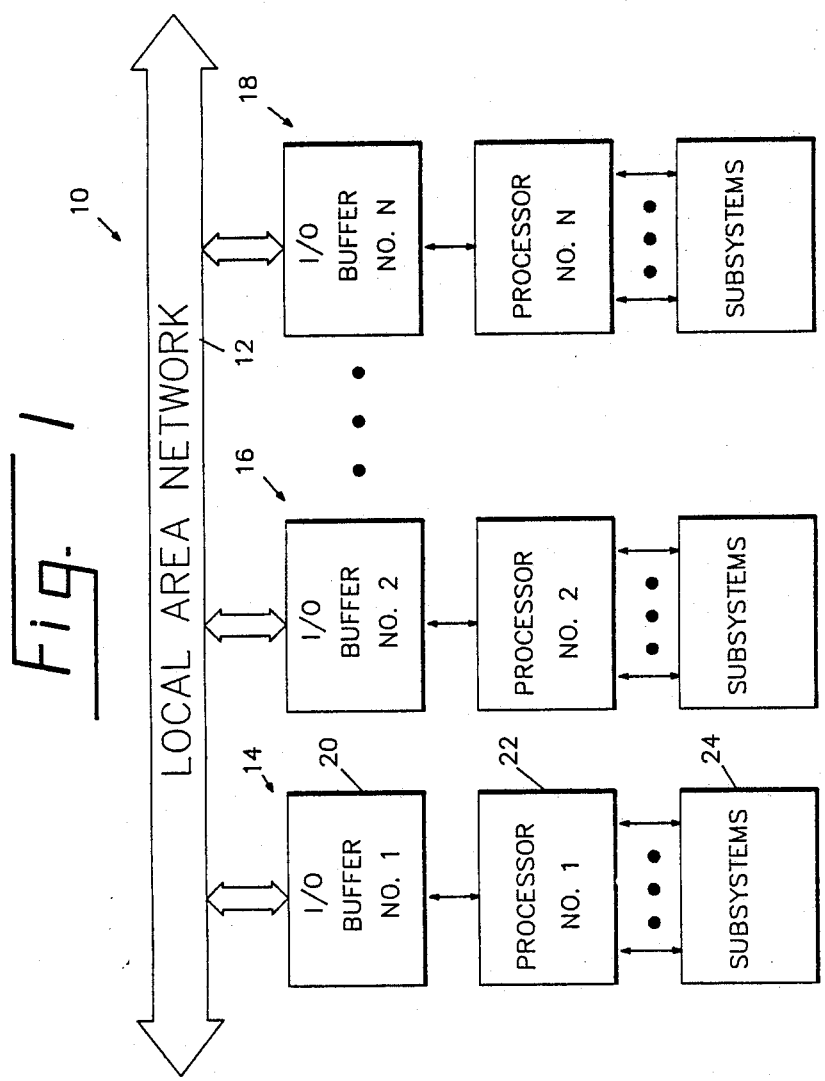

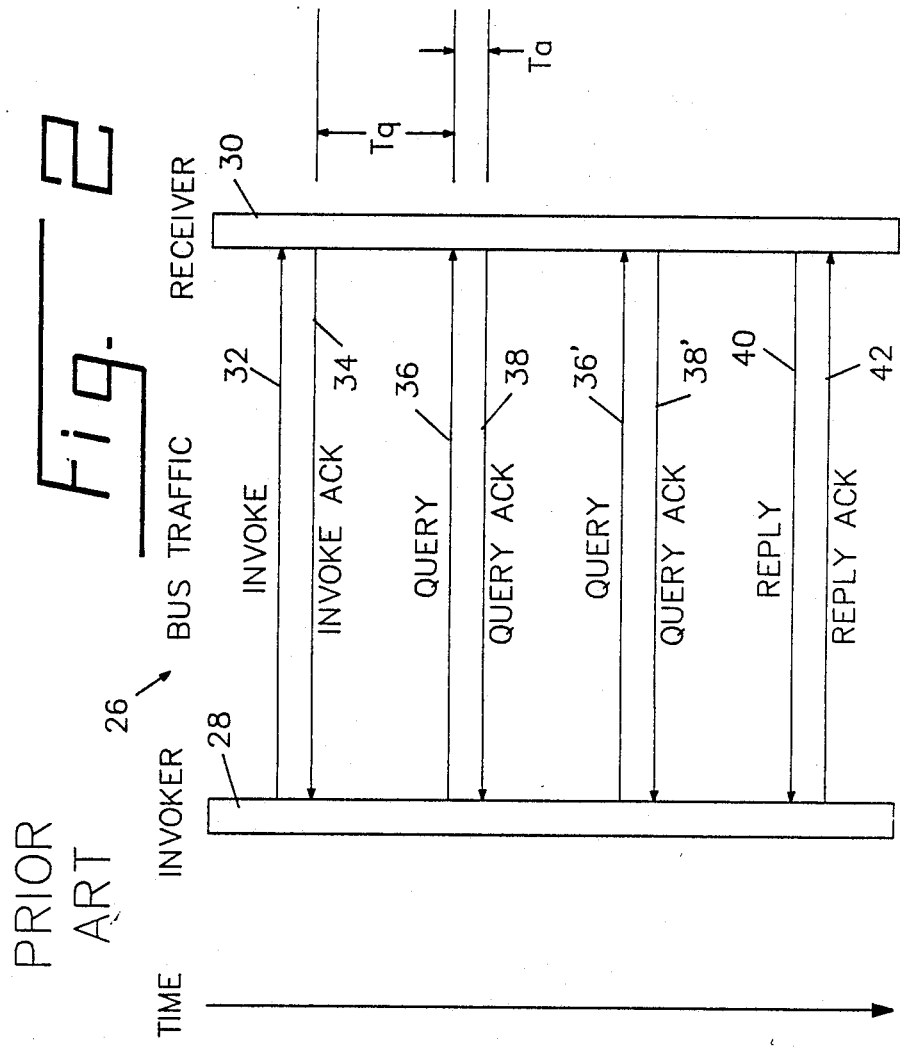

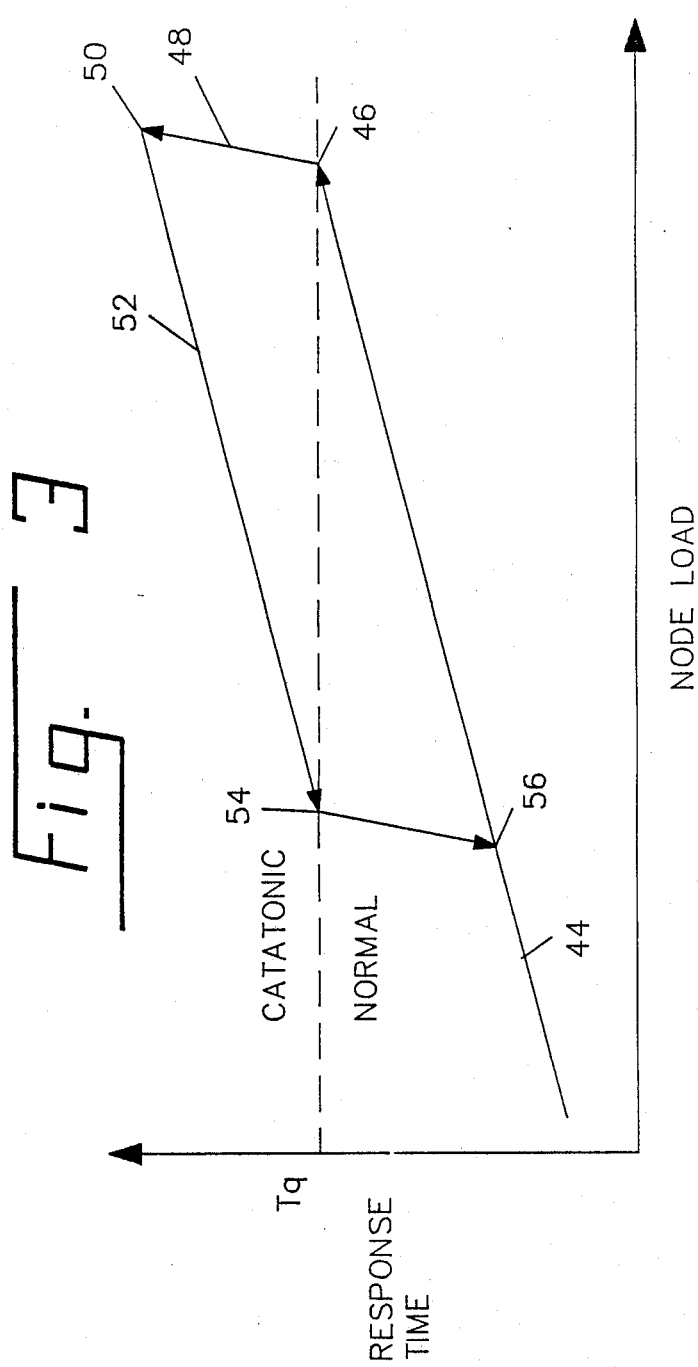

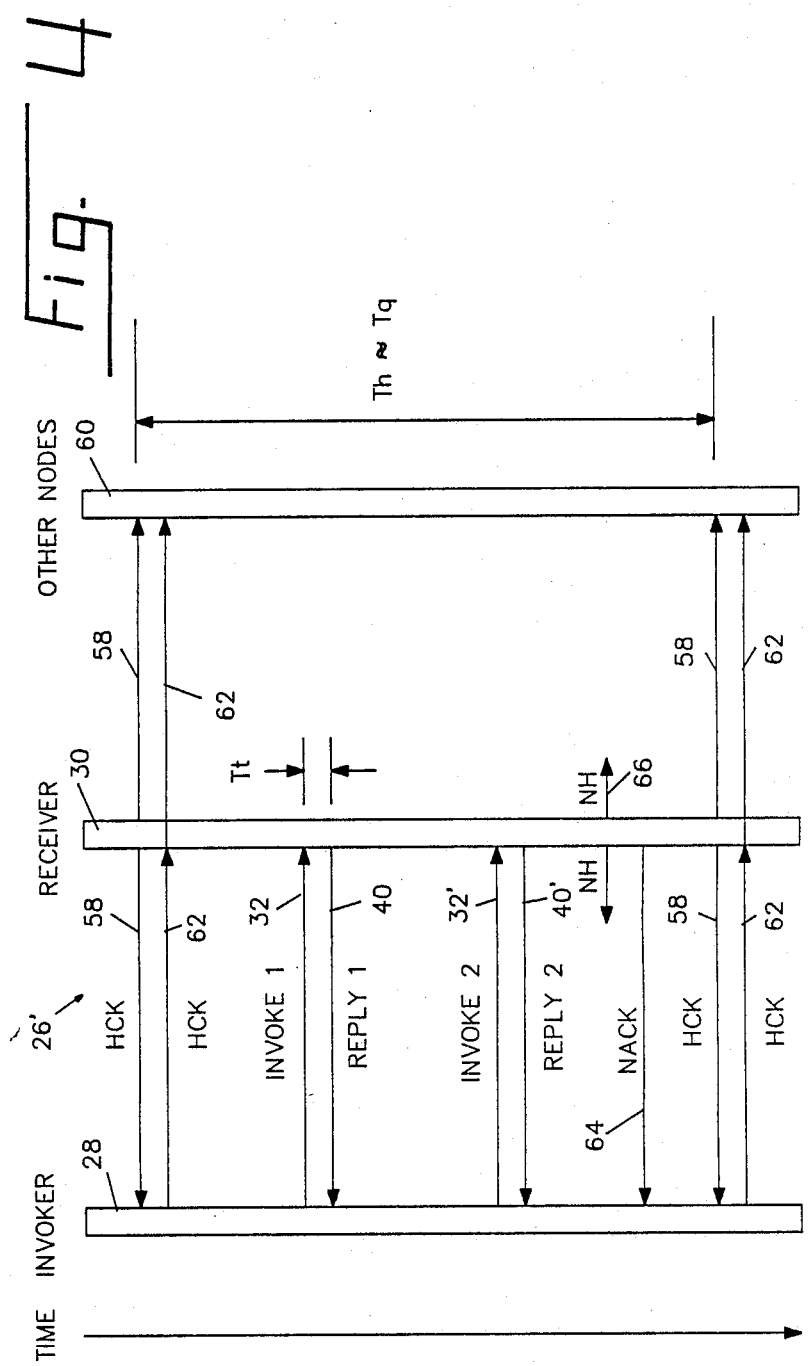

RENDEZVOUS NETWORK PROTOCOL WITH REDUCED BANDWIDTH AND PROCESSOR TIME

BACKGROUND OF THE INVENTION

The present invention relates to communications networks and, more particularly, to communications networks in which a plurality of processors each controls a plurality of tasks. Each task in the network is enabled to call upon any other task in the network for data or computation support.

Each processor, with its input/output buffers and tasks is called a node. Nodes are connected together over a network such as, for example, a bu or star network. A task requesting data or computation is called an invoker task. A task to which a request is directed is called a receiver task. When receiver and invoker tasks are associated with different nodes, the request is transmitted over the local area network. The network, whose arrangement is not of concern to the present invention, is controlled by software giving all nodes and tasks equal or fair access to the network.

The type of system with which the present invention is particularly concerned employs sporadic communications from and to each processor over the local area network. That is, a typical transaction requires a short invoking message from the invoker to invoke a task and a short reply message from the receiver node to convey the response from the receiver task back to the invoker task. Such short messages are conventionally transmitted in short bursts or packets containing a header identifying the invoker task and the destination task and the data. In the ideal situation, a complete transaction would require only the two messages, invoke and reply, to be transmitted over the network. In order to accomplish this, the invoker node would broadcast the invoking message packet for interception and execution by the receiver node. Similarly, the receiver node would broadcast the reply message packet when the requested task was completed. It is recognized that messages transmitted over a network are subject to hardware and software errors and to noise which partially or totally correct the data contained in the messages. If no mechanism is provided to account for lost, misdirected or corrupted messages, the invoker task has no way to determine that there is a problem. Thus, the invoker task could continue with activities that are inconsistent with accommodating hardware or software faults or with the results, or non-results, of noise-corrupted data. Accordingly, simple broadcast of invoking and reply messages can not provide satisfactory reliability except for messages whose loss or corruption would not affect important data or computation.

One conventional technique, called a rendezvous session-level protocol, ensures proper reception of data packets on a local area network. The rendezvous protocol includes transmitting an acknowledge data packet (ACK) from the receiver node directed to the invoker node confirming the correct receipt of the invoking data packet and confirming the existence of a task whose task identifier corresponds with that contained in the invoking data packet. This acknowledge data packet is transmitted only after the receiving node places the data in the invoking data packet in the input queue of the receiver task and determine that the receiver task exists and is alive and well.

If the task requires a substantial time for completion by the receiver task, it is conventional for the invoking node to transmit a query data packet to the receiver node after a predetermined time delay to verify that the receiver take continues in good health and continues to work on the invoked task, or that the invoked task is properly in the receiver node's input queue or is being worked on but is not yet completed. In response to the query data packet, the receiver node, after checking the condition of the receiver task and the invoked task, transmits query acknowledge data packet to the invoker node. In some instances, the time for the receiving task to complete the assigned work may result in the invoking node transmitting one or more query data packets before the invoked task is completed. Each query data packet is followed by an acknowledge data packet.

When the receiver task completes the invoked task, it transmits a reply data packet through the receiver node to the invoker node. The reply data packet contains the requested data or computation. In response to correct reception of the reply data packet, the invoker node transmits a reply acknowledge data packet directed to the receiver node to confirm correct receipt of the reply data packet.

It will be noted that each data packet between the invoker and receiver nodes is followed by an acknowledge data packet in the reverse direction. Thus, the transmission of acknowledge data packets doubles the number of messages on the local area network. This increased message overhead has the undesirable effect of increasing the amount of time consumed by the processors of the network in assembling and disassembling the extra data packets, as well as increasing the consumption network bandwidth beyond that which would be required in a system capable of omitting the acknowledge data packets.

In addition to these problems, the conventional rendezvous protocol has a built-in positive feedback effect wherein an overloaded condition at a receiver node results in a catatonic condition without means either to work off the overload or apply back pressure on invoking nodes to reduce further requests for service. An overload condition frequently shows up as a quantity of data in an input buffer of the receiver node exceeding the buffer capacity. In this situation, some systems discard all invoking data packets from the input buffer of a catatonic node in order to permit resumption of activity. When this is done, the invoking nodes frequently have no way of knowing that their invoking requests have been discarded until elapse of a relatively long delay time without receiving a reply message is inferred to be caused by discard of invoking data packets. The relatively long delay retards system throughput

OBJECTS AND SUMMARY OF THE INVENTION

It is an object of the invention to provide a network protocol which overcomes the drawbacks of the prior art.

It is a further object of the invention to provide a network protocol which eliminates the need for returning an acknowledge data packet following each transmission of an invoke, query or reply data packet.

It is a still further object of the invention to provide a network protocol which eliminates acknowledge data packets without suffering data loss due to corrupted, lost or misdirected data packets.

It is a still further object of the invention to provide a network protocol including means for applying back pressure on invoking nodes to reduce service requests of a receiving node in danger of becoming overloaded.

It is a still further object of the invention to provide a network protocol employing broadcast health-check data packets from each node in the network signifying its own health or operative condition. All other nodes in the network, receiving the health-check data packet, maintain an updated network node status library If a health-check data packet is not received from a particular node for a predetermined period, that node is considered to be unhealthy.

It is a further object of the invention to provide a network protocol including a negative-acknowledge data packet, either broadcast or directed back to an invoking node, to indicate that a received data packet contained corrupted data.

It is still further object of the invention to provide a network protocol including a not-healthy data packet broadcast on the network to indicate that the broadcasting node is inoperative or is incapable of handling the data load being imposed upon it. Other nodes, upon receiving the not-healthy data packet, reduce or completely withhold further invoking data packets directed to the not-healthy node until they receive one or more health-check data packets.

Briefly stated, the present invention provides a network protocol which eliminates all acknowledge data packets. A health check data packet is broadcast periodically by each node in the network. Each node uses the health check data packets to maintain library of node health conditions, thereby permitting avoidance of transactions with a node that is not working. If a node detects bad data directed to it, it transmits a negative acknowledge data packet, thus permitting the originating node to correct and/or retransmit the data packet found to be bad. A node in danger of becoming overloaded broadcasts a distress message, whereby other nodes reduce data packets sent to it According to an embodiment of the invention, there is provided a method for controlling a network, the network including at least first and second nodes, comprising: connecting the at least first and second nodes to a common communications transmission medium, communicating between the at least first and second nodes using sporadic data packets, periodically broadcasting a first node-health data packet from the first node to all other nodes in the network, the first node-health data packet indicating that the first node is functional, periodically broadcasting a second node-health data packet from the second node to all other nodes in the network, the second node-health data packet indicating that the second node is functional, all nodes in the network, including the first and second nodes, updating an internal node-health library based on receiving, or failing to receive, the first and second node-health data packets, communicating a first data packet from the first node addressed to the second node, the first data packet being of a type requiring a reply, communicating a reply data packet from the second node addressed to the first node, and omitting the step of communicating a first data packet if the internal node-health library in the first node indicates that the second node is not functional.

According to a feature of the invention, there is provided a network controlled by the method of the preceding paragraph.

According to a further feature of the invention, there is provided a method for controlling a network, the network including at least first and second nodes, comprising: connecting the at least first and second nodes to a common communications transmission medium, communicating between the at least first and second nodes using sporadic data packets, periodically broadcasting a first node-health data packet from the first node to all other nodes in the network, the first node-health data packet indicating that the first node is functional, periodically broadcasting a second node-health data packet from the second node to all other nodes in the network, the second node-health data packet indicating that the second node is functional, all nodes in the network, including the first and second nodes, updating an internal node-health library based on receiving, or failing to receive, the first and second node-health data packets, communicating a first data packet from the first node addressed to the second node, the first data packet being of type requiring a reply, communicating a reply data packet from the second node addressed to the first node, omitting the step of communicating a first data packet if the internal node-health library in the first node indicates that the second node is not functional, verifying, in the second node, that the first data packet is a correct data packet, communicating a negative acknowledge data packet from the second node addressed to the first node if the first data packet is not received as the correct data packet, whereby the first node receives an indication that the first data packet was incorrectly received, and broadcasting a not-healthy data packet from the second node in the event of impending overload or failure of the second node, whereby all other nodes are enabled to reduce data packets addressed to the second node.

According to a still further feature of the invention, there is provided a network controlled according to the protocol of the preceding paragraph.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a schematic diagram of a local area network to which reference will be made in describing both the prior art and the present invention.

FIG. 2 is a flow-sequence diagram of a rendezvous protocol according to the prior art.

FIG. 3 is a curve to which reference will be made in describing problems with node overload.

FIG. 4 is a flow-sequence diagram of a network protocol according to an embodiment of the invention.

DETAILED DESCRIPTION OF THE PREFERRED EMBODIMENT

Referring first to FIG. 1, there is shown, generally at 10 a local area network consisting of a network bus 12 connected by conventional means to a plurality of nodes 14, 16 and 18. For present purposes, the particular arrangement of network bus 12 is not of concern. For example, network bus 12 may be arranged as a bus, star or ring, provided that communications is provided to all nodes 14, 16 and 18. Access to network bus 12 is controlled in some fashion to permit either fairness or adherence to a predetermined priority scheme. Two access-control techniques include polling or token-passing and contention systems. In a polling or token-passing system, each node is polled in turn to determine whether it has a data packet for transmission on network bus 12. If a data packet is ready when a node is polled, the node transmits its data packet. The remainder of the nodes on local area network 10 await completion of the transmission of the data packet from the polled node. On completion of the transmission, the next node is polled in sequence. In a contention system, each node listens for data packets being transmitted on network bus 12. If a node has a data packet ready for transmission, and it does not detect a data packet being transmitted by another node, it begins transmitting.

Each node such as, for example, node 14 includes an input/output buffer 20 interfaced with network bus 12, a processor 22 and a plurality of subsystems 24 available for performing tasks when invoked by a subsystem within node 14, or by a subsystem within a different node. When a subsystem 24 is invoked by a subsystem within a foreign node, a data packet containing the request for the task is transmitted from the invoking node to node 14, which here is assumed to be the receiving node, over network bus 12.

The nature of the devices and/or tasks falling within subsystems 24 is also unimportant to the present invention. One subsystem 24 may be, for example, an electronic mail system. Another may be, for example, a data-acquisition device measuring one or more parameters in an industrial process. A still further example may include a control device, such as a valve, controlled in response to a data packet incoming on network bus 12.

It is possible that two nodes may find network bus 12 unoccupied and begin transmitting at the same time. A collision-detection scheme prevents the data from either node being corrupted in this event. Both nodes monitor network bus 12 while they are transmitting. When the two nodes detect the presence of a competing data packet on network bus 12, they both cease transmission before completing a data packet. Since a data packet is not completed, no other node accepts the data in either of the two data packets, all of the data is discarded or ignored in the other nodes. Then, a variable (generally randomly selected) delay is imposed on each of the two nodes before they are permitted to retry their transmission. Since the delay times are of different durations, the first node to time out its delay begins to transmit if network bus 12 is free. The node with the longer time delay listens to network bus 12 and finds it occupied by the data packet being transmitted by the node with the shorter time delay. As a consequence, the node with the longer time delay awaits completion of the data packet from the node with the shorter time delay before it finds a quiet network bus 12 and begins transmitting its data packet.

The foregoing description of techniques for avoiding interference between data packets originating at different nodes is for enhancing an understanding of the environment within which the present invention operates. The present invention, itself is indifferent to the manner in which these functions of network bus 12 are performed. Indeed, it is contemplated that other techniques for organization to avoid interference are equally accommodated by the present invention.

Referring now to FIG. 2, a flow-sequence diagram 26 illustrates the flow of traffic on network bus 12 (FIG. 2), using a conventional rendezvous protocol, between a single pair of nodes, identified as an invoker node 28 and a receiver node 30. Time elapses in the downward direction. An invoke data packet 32 is transmitted from invoker node 28 to receiver node 30. A short time later, after receiver node 30 has determined the health of the invoked task and placed the invoke data in the input queue of the invoked task, an invoke acknowledge data packet 34 is transmitted from receiver node 30 to invoker node 28 to inform invoker node 28 that the destination invoke data packet has been properly received and is in the process of being executed.

Many types of tasks take a substantial time to complete. If invoker node 28 merely waits for a reply, such reply data packet may not be generated by receiver node 30 due to a hardware or software fault occurring after transmission of invoke acknowledge data packet 34. Accordingly, if invoker node 28 fails to receive a reply data before the end of a query delay time Tq, it transmits a query data packet 36 to receiver node 30. After determining that the invoked task remains healthy and that the invoking data remains in effect, but tee task is not completed, receiver node 30 transmits a query acknowledge data packet 38 to invoker node 28. A query acknowledge delay time Ta elapses between receipt of query data packet 36 and transmission of query acknowledge data packet 38 to provide time for processor 22 to process the incoming data packet, check the status of the task and then format query acknowledge data packet 8 for transmission.

If invoker node 28 fails to receive a reply before a time equal to Tq following query acknowledge data packet 38, invoker node 28 transmits a further query data packet 36' to again check the status of the invoked task. As before, receiver node 30 transmits a further query acknowledge data packet 38'. Additional query and query acknowledge data packets are transmitted until a reply data packet 40, containing the results of the invoked task, is transmitted from receiver node 30 to invoker node 28. In response to reply data packet 40, invoker node 28 transmits a reply acknowledge data packet 42 to receiver node 30 to confirm receipt of the reply.

The foregoing description focuses on a single pair of nodes with a single task being invoked. A typical local area network contains many more than two or three nodes. Frequently a local area network contains 100 or more nodes, with each node controlling one or more tasks. The situation can easily arise in a local area network wherein a large number of nodes may attempt to invoke tasks in a single node at the same time. Such a large number of tasks may exceed the ability of the node to accommodate them. A positive-feedback effect, inherent in the rendezvous protocol illustrated in FIG. 2, permits the overloaded node to collapse into a catatonic state from which no graceful recovery procedure is available.

FIG. 3 illustrates the degradation in response time as the communications load imposed by the entire network on a single receiver node increases. Referring also to FIG. 2, besides invoke data packet 32, invoke acknowledge data packet 34, query data packet 36 and query acknowledge data packet 38 (plus repetitions of query data packet 36' and query acknowledge data packet 38') from the single invoker node illustrated, dozens to hundreds of additional invoking and query data packets may be simultaneously directed to receiver node 30. As may be expected, the response time of a receiver node increases along a response line 44 as the communications load on the receiver node increases. The communications load consists of invoke, invoke acknowledge, query, query acknowledge, reply and reply acknowledge data packets from and to all of the concerned nodes in the network. If the response time degrades to a critical point 46, then the node communications capacity becomes almost fully occupied processing query data packets 36 and reply data packets 40. As a result, beyond critical point 46 the node becomes catatonic. As the node load increases beyond critical point 46, almost no progress is made on completing the invoked tasks. Even small increases in node load result in large increases in response time, as indicated by a steeply sloped line 48. The fact that practically no invoked task is completed at node loads beyond critical point 46 results in even more query data packets being transmitted by invoker nodes that have not received a reply data packet. This catatonic condition feeds on itself, the higher the node load, the greater the backlog of uncompleted invoke messages, and the slower the response. No mechanism is available to limit continued degeneration. Soon, input/output buffer 20 (FIG. 1) becomes full and overflows, thus losing invoke commands.

In the prior art, one technique for breaking the log-jam created by the catatonic condition includes dumping all of the data in input/output buffer 20. Momentarily, this returns the response condition to the left, unloaded, end of response line 44. However, it is likely that most or all of the nodes demanding service rapidly will reload the receiver node to the catatonic condition. In the interim period, at least some tasks may be completed, whereby at least some of the load may be relieved. One skilled in the art will recognize that dumping the data in input/output buffer 20 is not an ideal solution because of the disruption and loss of commands entailed.

If a reduction in node load should occur at, for example, a condition indicated by a reduced-load point 50, but the node load is still heavier than optimum, the response time is reduced along a downward-sloping line 52 until a further critical point 54 at which the response time again reaches Tq. Further reductions in node load produce a rapid improvement along a critical point 54 until response line 44 is intercepted at an intersection point 56. The area enclosed by intersection point 56, critical point 46, reduced-load point 50 and critical point 54 are seen to be a well-known hysteresis curve. That is, for normal operation to resume on response line 44 the onset of a catatonic condition, the node load must fall considerably below the value it attained in the increasing direction along response line 44 when the catatonic condition began.

We have discovered that it is possible to define a protocol to replace the rendezvous protocol described above, a which eliminates the need for all invoke acknowledge data packets 34, query data packets 36, query acknowledge data packets 38 and reply acknowledge data packets 42 without suffering from the effects of unknown network hardware and software failures.

Referring now to FIG. 4, there is shown a flow-sequence diagram 26' according to an embodiment of the invention. As in the rendezvous protocol previously described, an invoker node 28 and a receiver node 30 engage in invoke and reply transactions. However, in contrast to the prior-art protocol, all acknowledge data packets and all query data packets are omitted. Instead, each node periodically broadcasts a health-check data packet to all other nodes in the network. That is, receiver node 30 broadcasts a sequence of health check data packets 58 at relatively long intervals of Th to all nodes in the network including invoker node 28 and all other nodes 60. The interval Th may be, for example, on the same order of length as the query interval Tq in the rendezvous protocol. Similarly, invoker node 28 broadcasts a health check data packet 62 to receiver node 30 and other nodes 60 in flow-sequence diagram 26'. Each node, in other nodes 60 also periodically broadcasts a health check data packet, but such additional data packets are not shown in the figure in order to reduce clutter.

A health check data packet may be very short since, being broadcast, it require only the identity of the transmitting node, a time stamp and a code indicating the type of message (health check). In contrast, an acknowledge data packet is longer, since it also requires a destination address. When any node receives a health check data packet, it updates an internal network health status library to indicate the current healthy condition. The ability of receiver node 30 to broadcast health check data packet 58 is taken as at least a partial proof of its own health. Accordingly, when receiver node 30 detects that it has been successful in broadcasting health check data packet 58, it updates its own internal network health status library with the information that it, itself, is healthy. After a delay slightly longer than Th, if receiver node 30 fails to broadcast health check data packet 58, every other node in the network changes the status of receiver node 30 from healthy to unhealthy. The healthy or unhealthy status condition stored in the internal network health status library of each node thus contains a picture for each node of the health or non-health of every other node in the network, as well as its own health.

If invoker node 28 needs to send an invoke data packet 32 to receiver node 30 it verifies the health of receiver node 30 from its internal network status library before it transmits invoke data packet 32. If the current status of receiver node 30 is healthy, invoker node 28 transmits invoke data packet 32. If the internal network status library indicates that receiver node 30 is not healthy, invoker node 28 does not attempt to transmit invoke data packet 32. Thus, if a node is not healthy, no other node attempts to invoke a task in it.

When an invoked task is completed, receiver node transmits a reply data packet 40 to invoker node 28 as in the prior-art rendezvous protocol. The length of Th is chosen to be long compared to the transaction time Tt between invoke data packet 32 and reply data packet 40. One or more additional invoke data packets 32' and reply data packet 40' may occur before the next health check data packet 58 is broadcast. If a satisfactory reply data packet 40 is received, then the transaction is considered to be complete. If invoke data packet 32 and reply data packet 40 bridge the time that the next scheduled reduced-load point 50 should arrive, the action taken in invoker node 28 depends on whether or not the scheduled health check data packet 58 arrives. If it does arrive, indicating the continued health of receiver node 30, then reply data packet 40, arriving later, is accepted as a proper message. If the scheduled health check data packet 58 fails to arrive, even though an apparently correct reply data packet 40 is later received, ts integrity is suspect and its content is may be discarded. Indeed, upon failing to receive a scheduled health check data packet 58, invoker node 28 may discard all reply data it has received since the last time it received a health check data packet 58 broadcast by receiver node 30. In the preferred embodiment, reply data is not discarded under these circumstances.

When a health check data packet 58 fails to arrive at the scheduled time, all nodes update their internal network status library to indicate that receiver node 30 is not well. If a correct health check data packet 58 should arrive later from receiver node 30, all libraries may be again changed to indicate a healthy condition. In the preferred embodiment, however, a slightly more conservative approach requires the arrival of two successive, correctly timed, health check data packets 58 before the status of receiver node 30 in the libraries is changed to healthy.

The foregoing protocol permits all nodes in a network to know whether or not all other nodes are alive and well. Thus, nodes do not attempt to invoke tasks in a dead node. It does not, however, solve the problems of misdirected or corrupted messages or of node overload.

A corrupted invoke data packet 32 may contain a correct source address for invoker node 28 and a correct destination address for receiver node 30, but the data portion of the message may be corrupted by noise or may be otherwise undecipherable. Receiver node 30 may detect the presence of corrupted data by any conventional means such as, for example a cyclic redundancy check. In this circumstance, receiver node 30 may direct a negative acknowledge (NACK) data packet 64 to invoker node 28 indicating that satisfactory data has not been received and indicating the cause of failure, if known. This provides an opportunity for invoker node 28 to correct and/or renew its invoke data packet 32. Such corrupted messages constitute a minuscule portion of all invoke data packets 32, and thus the increase in network traffic required to accommodate NACK data packets 64 is also minuscule.

A NACK data packet 64 may also be transmitted by receiver node 30 if an invoke data packet 32 attempts to invoke a task which is not available in receiver node 30. This can happen, for example, by reason of a mistake in destination address when invoker node 28 formats invoke data packet 32 which should correctly be directed to a node in other nodes 60. This type of error is typically even rarer than that of corrupted data, and its contribution to network load can be ignored.

Even with the reduction in network load provided by elimination of all acknowledge and query data packets, the response time of receiver nod 30 still degrades with increasing node load in a manner similar to response line 44 in FIG. 3. If the node load increases to the point of an impending catatonic condition, receiver node 30 broadcasts a distress data packet (NH) 66 on flow-sequence diagram 26' to indicate this fact. Invoker node 28 and other nodes 60, hearing the distress data packet 66, reduce or eliminate the addressing of invoke data packets 32 to receiver node 30. This reduces the load before the node load reaches critical point 46 (FIG. 3). Thus, operation always remains along response line 44 without forcing an emergency recovery from a catatonic condition.

If the procedure in the preceding paragraph is insufficient to avoid the loss of data, each distress data packet 66 may also contain information from which invoking nodes can reconstruct and/or retransmit data packets. For example, if a not healthy data packet contains a time stamp of the last data packet the transmitting node successfully processed, all other nodes may compare this time with the times at which they invoked tasks in the distressed node. Invoking data packets sent later than the time stamp are thus known to be lost.

To illustrate the improvement provided by the protocol of the present invention over the conventional rendezvous protocol, a network containing 100 nodes is assumed. A minimum complete transaction under the prior art requires four data packets, an invoke, invoke acknowledge, reply and reply acknowledge data packets. In a typical system, the processor overhead is about 2 milliseconds per data packet (one millisecond for the transmitting node to format the message and one millisecond for the destination node to decipher the message). Given a total of a minimum of four data packets to complete a transaction, the minimum processor time per transaction is about 8 milliseconds. If network response time degrades to the point that a significant number of query and query acknowledge data packets are generated as part of the transaction, the processor time increases by 4 milliseconds per query-query response. If each of the 100 nodes initiates 100 rendezvous per second, then the total amount of time consumed by all of the processors in the network in 5 seconds is about 400 seconds.

In contrast, the protocol of the present invention requires only two data packets per transaction, all queries and acknowledge data packets are eliminated. Accordingly, the present invention consumes only 200 seconds of network processor time per 5 seconds, plus about 10.1 seconds of network processor time for the health check data packets.

In terms of network bandwidth, an invoke and a reply data packet each requires about 120 microseconds, and the two acknowledge data packets of the conventional protocol each require about 20 microseconds. Thus, the conventional rendezvous protocol requires a minimum total of 280 microseconds of bandwidth. This value increases by 140 microseconds for each reply and reply acknowledge data packet. The present invention, by eliminating all acknowledge data packets requires only 140 microseconds of bandwidth, plus a health check overhead of 20 microseconds per node every 5 seconds. For comparison, the total bandwidth for 100 nodes with 100 transactions per second per node consumes 140 milliseconds of bandwidth for the prior art and 122 milliseconds for the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. A method for controlling a network, said network including at least first and second nodes, comprising:
    connecting said at least first and second nodes to a common communications transmission medium;
    communicating between said at least first and second nodes using sporadic data packets;
    periodically broadcasting a first node-health data packet from said first node to all other nodes in said network;
    said first node-health data packet indicating that said first node is functional;
    periodically broadcasting a second node-health data packet from said second node to all other nodes in said network;
    said second node-health data packet indicating that said second node is functional;

all nodes in said network, including said first and second nodes, updating an internal node-health library based on receiving, or failing to receive, said first and second node-health data packets;

communicating a first data packet from said first node addressed to said second node;

said first data packet being of a type requiring a reply;

communicating a reply data packet from said second node addressed to said first node; and omitting the step of communicating a first data packet if said internal node-health library in said first node indicates that said second node is not functional.

2. A method according to claim 1, further comprising:

verifying, in said second node, that said first data packet is a correct data packet;; and communicating a negative acknowledge data packet from said second node addressed to said first node if said first data packet is not received as said correct data packet, whereby said first node receives an indication that said first data packet was incorrectly received 3. A method according to claim 1, further comprising: broadcasting a not-healthy data packet from said second node in the event of impending overload or failure of said second node, whereby all other nodes are enabled to reduce data packets addressed to said second node.

4. A method for controlling a network, said network including at least first and second nodes, comprising:

connecting said at least first and second nodes to a common communications transmission medium;

communicating between said at least first and second nodes using sporadic data packets;

periodically broadcasting a first node-health data packet from said first node to all other nodes in said network;

said first node-health data packet indicating that said first node is functional;

periodically broadcasting a second node-health data packet from said second node to all other nodes in said network;

said second node-health data packet indicating that said second node is functional;

all nodes in said network, including said first and second nodes, updating an internal node-health library based on receiving, or failing to receive, said first and second node-health data packets;

communicating a first data packet from said first node addressed to said second node;

said first data packet being of a tape requiring a reply;

communicating a reply data packet from said second node addressed to said first node;

omitting the step of communicating a first data packet if said integral node-health library in said first node indicates that said second node is not functional;

verifying, in said second node, that said first data packet is a correct data packet;

communicating a negative acknowledge data packet from said second node addressed to said first node if said first data packet is not received as said correct data packet, whereby said first node receives an indication that said first data packet was incorrectly received; and broadcasting a not-healthy data packet from said second node in the event of impending overload or failure of said second node, whereby all other nodes are enabled to reduce data packets addressed to said second node.

* * * * *